United States Patent
Mishra et al.

(10) Patent No.: US 9,495,383 B2
(45) Date of Patent: Nov. 15, 2016

(54) REALTIME ACTIVITY SUGGESTION FROM SOCIAL AND EVENT DATA

(71) Applicant: Microsoft Corporation, Redmond, WA (US)

(72) Inventors: Pragyana K. Mishra, Bellevue, WA (US); Nagareddy S. Reddy, Sammamish, WA (US)

(73) Assignee: Microsoft Technology Licensing, Redmon, WA (US)

( * ) Notice: Subject to any disclaimer, the term of this patent is extended or adjusted under 35 U.S.C. 154(b) by 127 days.

(21) Appl. No.: 13/974,014

(22) Filed: Aug. 22, 2013

(65) Prior Publication Data

US 2015/0058345 A1   Feb. 26, 2015

(51) Int. Cl.
  *G06F 3/00* (2006.01)
  *G06F 17/30* (2006.01)
  *G06Q 50/00* (2012.01)

(52) U.S. Cl.
  CPC ......... *G06F 17/30241* (2013.01); *G06Q 50/01* (2013.01)

(58) Field of Classification Search
  CPC .............................................. G06F 17/30241
  USPC ........................................................ 715/751
  See application file for complete search history.

(56) References Cited

U.S. PATENT DOCUMENTS

| 8,467,955 | B2 | 6/2013 | Jiang et al. | |
|---|---|---|---|---|
| 2009/0106040 | A1 | 4/2009 | Jones | |
| 2009/0177513 | A1* | 7/2009 | Eckhart | G01C 21/343 705/7.18 |
| 2009/0216633 | A1* | 8/2009 | Whitsett | G06Q 30/02 705/14.36 |
| 2009/0287687 | A1 | 11/2009 | Martire et al. | |
| 2010/0228574 | A1* | 9/2010 | Mundinger | G06Q 10/047 705/4 |
| 2012/0233158 | A1 | 9/2012 | Braginsky et al. | |

(Continued)

FOREIGN PATENT DOCUMENTS

WO   2012174230 A1   12/2012

OTHER PUBLICATIONS

Vosecky, et al., "Limosa: A System for Geographic User Interest Analysis in Twitter", In Proceedings of the 16th International Conference on Extending Database Technology, Mar. 18, 2013, 4 pages.

(Continued)

*Primary Examiner* — Omar Abdul-Ali
(74) *Attorney, Agent, or Firm* — Dave Ream; Aaron Hoff; Micky Minhas (57) ABSTRACT

Architecture that aggregates realtime geo-referenced data over areas such as physical world geographical areas and virtually-defined areas such as by geofences to provide users with a quick overview and suggestion of activities to do across an area of interest in the spatial extent. The geo-referenced data can be supplied by a provider and/or user. When in combination, event listings can be obtained from providers and social data (e.g., check-in) can be obtained from social websites and/or businesses that make check-in data available freely or under subscription, for example. At least one advantageous outcome of the disclosed aggregation approach is that privacy issues, which currently exist in the industry by showing exact locations of user-contributed data, are overcome. While aggregating over larger spatial extents having high activity, the events supplied by provider listings are assigned scores that show trending and/or high-user activity volumes, and therefore, can be suggested to users.

20 Claims, 8 Drawing Sheets

(56) References Cited

U.S. PATENT DOCUMENTS

| 2013/0060744 | A1 | 3/2013 | Roychoudhuri et al. | |
|---|---|---|---|---|
| 2013/0073632 | A1 | 3/2013 | Fedorov et al. | |
| 2013/0080922 | A1* | 3/2013 | Elias et al. | 715/753 |
| 2013/0198277 | A1* | 8/2013 | Pedregal | G06Q 30/0282 709/204 |
| 2013/0238370 | A1* | 9/2013 | Wiseman | G06Q 10/02 705/5 |

OTHER PUBLICATIONS

Bee, et al., "Hazard Map—Real Time Hazard Mapping Using Social Media", In AGI Geocommunity: Sharing the Power of Place, Sep. 18, 2012, 10 pages.

Gorman, Sean, "Helping to Pioneer Real Time GIS with Social Streams", Available at: http://blog.geoiq.com/2013/03/08/pioneering-real-time-gis-with-social-streams/, Published on: Mar. 8, 2013, 2 pages.

Perella, Steve, "Full Coverage of Anonymized Foursquare Check-In Data Now Available Exclusively from Gnip", Available at: http://blog.gnip.com/gnip-foursquare-partnership/, Published on: May 23, 2013, 5 pages.

Rao, Leena, "Buzzd Aggregates Check-Ins from Foursquare, Gowalla and Others in Social City Guide", Available at: http://techcrunch.com/2010/06/03/buzzd-aggregates-check-ins-from-foursquare-gowalla-and-others-in-social-city-guide/, Published on: Jun. 3, 2010, 2 pages.

Sakaki, et al., "Earthquake Shakes Twitter Users: Real-time Event Detection by Social Sensors", In Proceedings of the 19th International Conference on World Wide Web, Apr. 26, 2010, 10 pages.

"International Search Report and Written Opinion Issued in PCT Patent Application No. PCT/US2014/51572", Mailed Date: Mar. 18, 2015, 7 pages.

* cited by examiner

REALTIME ACTIVITY SUGGESTION FROM SOCIAL AND EVENT DATA

BACKGROUND

While a number of applications and online services focus on finding and suggesting events, places, restaurants, hotels, and other entities, there are no applications and services that can recommend or suggest activities or things to do in a spatial area for a specified time based on event listings and past and current social check-in data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture aggregates realtime geographically referenced ("geo-referenced") data over areas (also, more generally as "spatial extents") such as physical world geographical areas and virtually-defined areas such as by geofences to provide users with a quick overview and suggestion of activities and events to do across an area of interest in the spatial extent. (A geofence is a virtually defined perimeter or boundary relative to (e.g., around) a physical geographical area such as a shopping mall, park, etc. When a device or user suitably equipped is detected to have intersected (e.g., via latitude/longitude analysis) the virtually defined perimeter or boundary, an action can be taken, such as sending a notification to the user or device.) The geo-referenced data can be supplied by a provider and/or user. The provider includes, but is not limited to, a search engine or any other entity or system that collects such geo-referenced information from suitable sources (e.g., the Internet). When in combination, event listings can be obtained from providers and social data (e.g., check-in) can be obtained from social websites such as Facebook™ and/or businesses that make check-in data available freely or under subscription, for example.

At least one advantageous outcome of the disclosed aggregation approach is that privacy issues, which currently exist in the industry by showing exact locations of user-contributed data, are overcome. Since the architecture aggregates social data and generates activity-suggestion profiles for users, any user-specific social data is effectively sanitized/obfuscated. Therefore, in order to safeguard the privacy of the personal and social data of users, user behavior and/or preferences are not explicitly modeled; rather, the architecture aggregates user data in the spatio-temporal domain (all users are treated the same) for generating activity suggestions. For example, while aggregating over larger spatial extents (e.g., geographical areas or regions) having high activity, the events supplied by provider listings are assigned scores that show trending and/or high-user activity volumes, and therefore, can be suggested to users.

Additionally, realtime activity scores based on social data can be used to compare two or more disparate spatial extents such as cities, neighborhoods, blocks, or streets. A user can compare two spatial entities based on the entity scores to decide where and when to go for a given activity. As an example, a user can use this architecture to compare the neighborhoods "Belltown" and "Capitol Hill" in Seattle for "attend live music" on a "Friday evening" based on scores derived from event data and aggregated realtime social data. Another example compares the cities of "Seattle" and "Portland" for "enjoy water sports/activities" in "summer" based on these scores.

The disclosed architecture enables at least: the realtime aggregation of activities for computing a set of salient activities for a given spatial extent; the aggregation of activities and suggestion of salient activities for a user-specified time; the display of salient activity regions on maps that delineate areas, streets, neighborhoods for a single activity or combination of two or more activities; the prediction of upcoming salient activities and areas for specified activities based on past activity and event data; the suggestion of salient activities based on user preferences, context, and intent for a given user-specified location; the suggestion of a series of activities and events (e.g., itinerary planning and suggestion) based on user-specified area and time; the suggestion (e.g., a push operation) of activities that are related to a specific activity chosen by the user depending on user location, time, and/or preference; and, the generation of activity profiles of users that can be applied as filters across different times and places for suggesting activities in realtime.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

There are a few applications that are activity-recommendation systems based on curated content; however, existing attempts include approaches that show interesting places on a map and allows users to pick out attractions they want to see ahead of time and create a schedule for seeing them, and detect events taking place in major cities and discover hot events by analyzing the number of photos that are taken of an event at a location. Another approach suggests spontaneous daytrip ideas based on where the user is located. Yet another approach enables a user to participate in an activity-recommendation network, which allows users to post things to do and organize activities with other users. The application automatically makes recommendations based on criteria such as the time of day and weather, for example. Another approach has a database of opinions about local attractions and activities and allows users to tell friends where they are "hanging out" and what they are doing.

However, all these existing applications/recommendation systems are deficient at least in the areas of aggregation of activities, aggregation and display of activity regions, agglomeration of activities, and a user-specified sliding temporal window.

With respect to high-level aggregation of activities based on event listings and social check-ins, none of these existing applications analyze event data and aggregate the event data into higher-level activity categories, such as "be outdoors" or "go sightseeing", that can be used for building activity-based classification of places and users types.

With respect to aggregation and display of activity regions on maps, these existing applications do not show what areas (e.g., neighborhoods, city blocks, streets, etc.) have high levels of a given activity. On the other hand, displaying activity regions in the form of heatmaps or delineated neighborhoods, blocks, and/or streets, for example, enable discovery and exploration of areas based on activity types.

Existing applications are also deficient in the agglomeration of multiple activity or combination of more than one activity. These applications do not enable users to combine multiple activities for search and discovery. The activities are disparate—one or more activities can be agglomerated from social data and the other activities from provider-supplied event listing data. On the other hand, where collected, the combination of different realtime activity/event data can be used for displaying multi-activity regions and suggesting things/activities to do (where realtime is processing in the timespan that the actual event is occurring or shortly before).

Moreover, no existing applications provide the capability of a user-specified temporal sliding window. The services do not allow users to browse regions and activities over spans of time. Activity suggestion for forward-looking time windows can have time periods specified by the user, such as the next weekend, next one week, next month or next three months, or summer/fall/winter, for example.

The disclosed architecture aggregates realtime geographically referenced ("geo-referenced") data over geographical areas (also, "spatial extents") to provide users with a quick overview and suggestion of activities to do across an area of interest in the spatial extent. The geo-referenced data can be supplied by a provider and/or user. When in combination, event listings can be obtained from providers and social data (e.g., check-in) can be obtained from social websites such as Facebook™ and/or businesses that make check-in data available freely or under subscription, for example.

One advantageous outcome of the disclosed aggregation approach is that privacy issues (that currently exist in the industry by showing exact locations of user-contributed data) are overcome. While aggregating over larger spatial extents (e.g., geographical areas or regions) having high activity, the events supplied by provider listings are assigned scores that show trending and/or high-user activity volumes, and therefore, can be suggested to users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
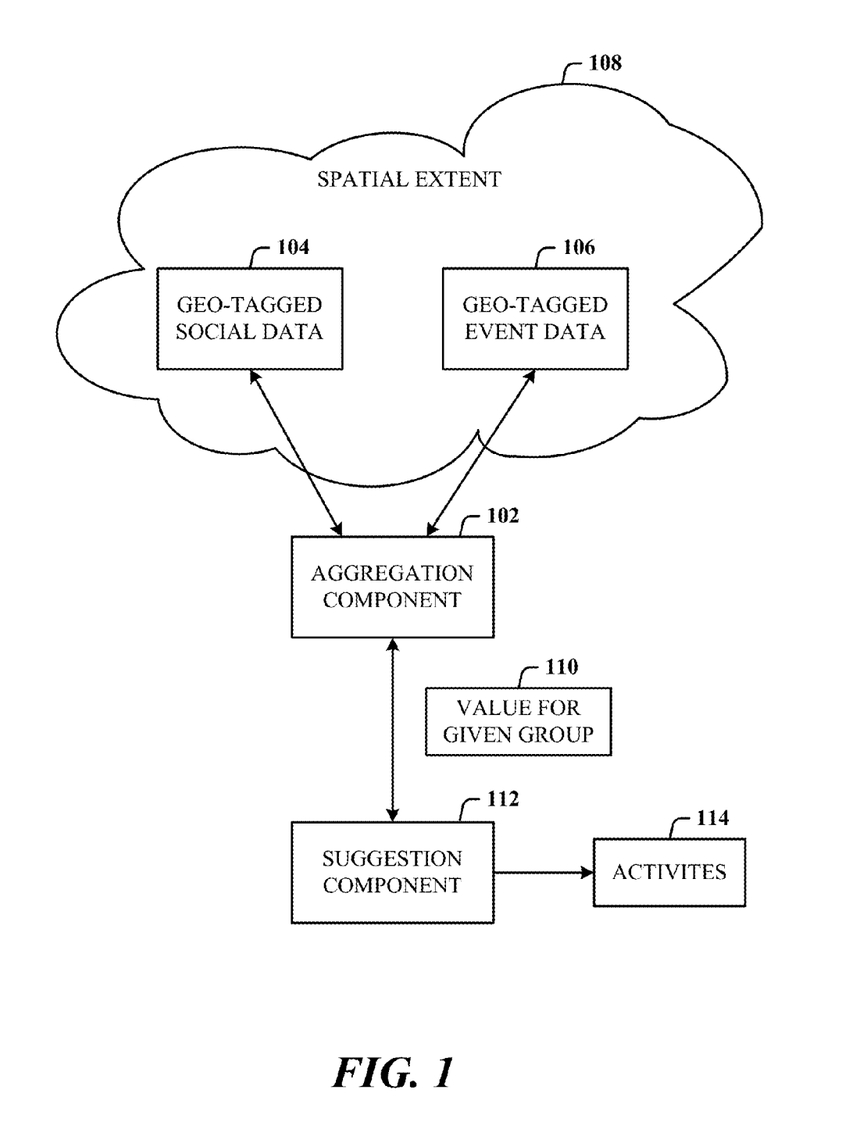
FIG. 1 illustrates a system in accordance with the disclosed architecture.

FIG. 1 illustrates a system 100 in accordance with the disclosed architecture. The system 100 can include an aggregation component 102 that receives geographically-referenced (also called geo-tagged) social data 104 and geographically-referenced event data 106 associated with a spatial extent 108 (e.g., geographical areas such as countries, states, regions, cities, counties, city blocks, neighborhoods, user-specified geographical areas, and virtually-defined areas such as geofences). The aggregation component 102 aggregates the event data 106 over a span of time (e.g., a sliding window of fixed time span), identifies groups of event locations based on the aggregated event data 106, and aggregates the social data 104 for each group over the span of time to derive a value 110 as a measure of attendance and/or popularity for a given group.

A suggestion component 112 suggests activities in the spatial extent 108 to a user (e.g., that may be of interest to the user) based on the values for the corresponding groups. The social data 104 is check-in data and the spatial extent 108 is a geographical area or a virtually defined area. The aggregation component 102 models an event and associated popularity distribution across the spatial extent 108. The suggestion component 112 suggests activities 114 based in part on user preferences, user context, and user intent for a given user-specified location. The suggestion component 112 suggests a series of activities and events based on a user-specified time and location. The suggestion component 112 suggests new activities that relate to a given selected activity based on user location, time, and/or preferences.

Figure 2:
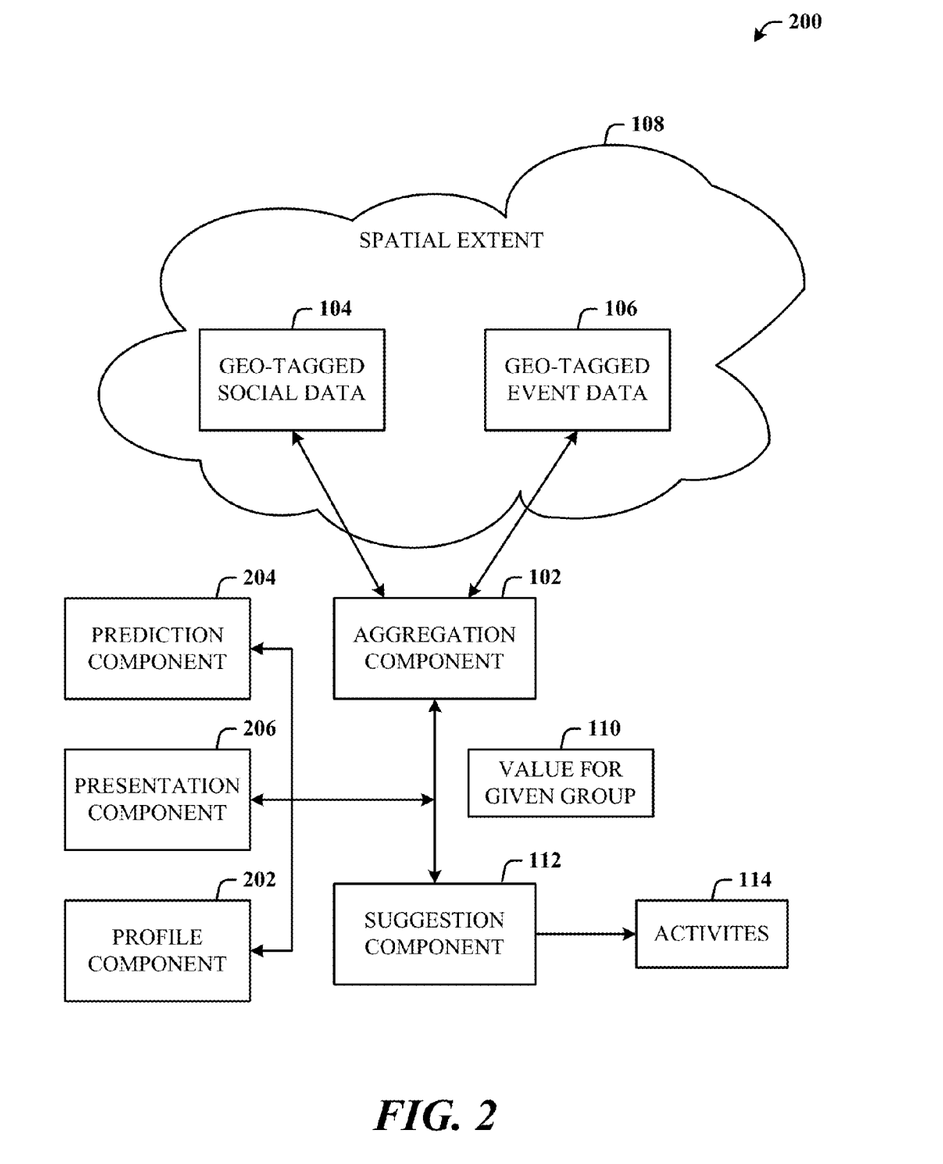
FIG. 2 illustrates an alternative system in accordance with the disclosed architecture.

FIG. 2 illustrates an alternative system 200 in accordance with the disclosed architecture. The system 200 comprises system 100 with the addition of a profile component 202, a prediction component 204, and a presentation component 206. The profile component 202 generates activity profiles of users, which profiles can be applied as filters across different times and locations for suggesting the activities by the suggestion component 112 in realtime. The prediction component 204 predicts future activities and spatial extents for the future activities based on past activity and event data. User feedback can be enabled as to the suggested information as a way to improve the suggestion component 112 (and overall systems 100 and 200). The presentation component 206 provides activity regions on a map (e.g., a heatmap) that delineates areas, streets, and neighborhoods for one or more activities and for presentation to the user.

More specifically, the disclosed architecture enables: the realtime aggregation of activities for computing set of salient activities for a given spatial extent; the aggregation of activities and suggestion of salient activities for a user-specified time; the display of salient activity regions on maps that delineate areas, streets, neighborhoods for a single activity or combination of two or more activities; the machine-based prediction of upcoming salient activities and areas for specified activities based on past activity and event data; the suggestion of salient activities based on user preferences, context, and intent for a given user-specified location; the machine-based suggestion of a series of activities and events (e.g., itinerary planning and suggestion on a chronological basis and/or optimal expedient basis) based on user-specified area and time; the suggestion (e.g., a push operation) of activities that are related to a specific activity chosen by the user depending on user location, time, and preference; and, the generation of activity profiles of users that can be applied as filters across different times and places for suggesting activities in realtime.

The realtime aggregation of activities (by the aggregation component 102) can be based on social check-in data and event listings for computing sets of salient activities for a given spatial extent such as a neighborhood, city, county, geofenced, and/or user-specified area. The aggregation of activities by the aggregation component 102 and suggestion of salient activities (by the suggestion component 112) can be performed for a user-specified time, such as today, tomorrow, next weekend, next month, summer, fall, or any user-specified time.

Dynamic display of activity data by the presentation component 206 for a user-specified area is provided to peruse variation of activities over time. The display of salient activity regions on maps is provided that delineates areas, streets, neighborhoods for a single activity or combination of two or more activities. For example, displaying heatmaps (a graphical representation where different values are represented as correspondingly different colors, such as in a thermal relationship where variations of reds are a higher values and variations of blues are lower values) that show areas with high "dine" activity or areas that have "dine and listen to music" or "dine and listen to music and be with family" activities. The heatmaps for multiple activities are combined overlays that show aggregated activities.

The prediction of upcoming salient activities and areas for specified activities (by the prediction component 204) can be based on past activity and event data; for example, an activity of "go sightseeing" is preemptively suggested for the "Seattle" area for the "months of April and May" (e.g., due to the cherry blossom and tulip festival) and based on previous data (e.g., the prior year).

The suggestion of salient activities by the suggestion component 112 can be based on user preferences, context, and intent for a given user-specified location. For example, for a user that prefers outdoor activities, the suggested activities for the "Pacific Northwest" area during the month of "July" include "hike", "kayak", "attend music festival", and "camp".

The suggestion component 112 also enables the derivation and arrangement of a series of activities and events (e.g., itinerary planning and suggestion) that can be based on user-specified area and time; for example, the suggestion of "go to farmer's market" followed by "go sightseeing" that is followed by "dine" for "Seattle downtown" on "Sunday". The suggestions are based on the aggregation of past check-in/social and event data and take into consideration upcoming event listings as well.

Additionally, activities that are related to a specific activity chosen by the user and depending on user location, time, and preference can be suggested (e.g., pushed) by the suggestion component 112. For example, if a user is outdoors for "go sightseeing" at the "Pike Place market" on "Saturday afternoon", then an additional suggestion can be a nearby "adventure" of riding the Seattle Ferris Wheel, or "listen to music" concert at the "Triple Door" or "Seattle Symphony" in the "evening".

The profile component 202 of the disclosed architecture can generate "activity profiles" of users, which can then be applied as filters across different times and places for suggesting activities in realtime (processing at or near the timespan at which the actual event is occurring). Users with similar activity profiles can opt-in for receiving group activities in a specific area and time, as well as coupons/group discounts for events in high-activity locations.

A user "activity profile" is the set of most dominant activities that has been suggested to the user based on the user's past selection of area, time, and/or preferences. For example, an activity profile can be "Going to live music in SoDo (a neighborhood of Seattle) or the George (a social environment near Seattle) in summer, "Dining" in Capitol Hill, or "Shopping in Belltown", instead of the more intrusive user profile of "20-28 year old hipster college-educated female with moderate disposable income". This may or may not be extended to encompass user interactions with mobile or webpage content or advertisements. In other words, an activity profile primarily encapsulates a set of dominant activities (e.g., may include the place and time) for a user (which may predominantly result in selection of the activity or corresponding check-in data).

"Activity profiles" of users is not necessary for assessing what activities to suggest to a new user. "Activity profiles" of users are byproducts or outcomes of the activity suggestion system, which in turn can be used for many different applications (e.g., matching different users based on their activity profiles, filtering different activities for suggesting to new users and users who have not specified all their requirements be it time, spatial area, activity preferences, or any combination thereof).

The activity profiles can be used/consumed by collaborative filtering systems (e.g., for matchmaking, social clubs/cliques/meet-up groups, etc.). A typical problem in most collaborative-filtering systems and content-based recommendation systems is the scarcity or sparseness of data (e.g., where no user has previously selected activities or preferences based on time and area, or where initially, there may be an insufficient number of users), also known as the "cold start" problem.

The disclosed activity suggestion system does not depend on any user profile of activities; rather, the system takes social check-in data at venues and events and provider event data to suggest activities. No matching is required of that specific user's profile/behavior/preference to another user with similar profile. Thus, the disclosed suggestion architecture does not suffer from the cold start problem as well.

Activity profiles are neither necessary nor sufficient for making realtime activity suggestions based on what is happening in a specified neighborhood/area at a specified time. Once computed, these activity profiles may be applied to refine activity suggestions to other users based on matching of their profiles; however, this is discretionary or optional—the suggestion architecture performs optimally at suggesting activities based on what is 'happening' in a given area at a selected time.

In terms of "cause" and "effect", the disclosed event and social data aggregation and prediction for suggesting activities is the "cause", and one of the many resulting "effect" of this aggregation and prediction system is the generation of activity profiles of users (not the other way around).

In contrast, recommendation systems that are based on collaborative filtering take the profiles of users as input (the "cause") that result in recommendations (the "effect"). This is described below. However, here, the resulting activity profile or set of activity suggestions can be potentially used for myriad other applications such as group discounts/coupons for a group of people doing the same activity at the same time, filtering users based on their activity profiles to suggest group activities (e.g., such as tailgating, flashmobs, go karting, etc.) happening in a given area, or online match making/dating.

In accordance with a more detailed description of the capabilities disclosed herein, the disclosed realtime activity aggregation and suggestion architecture comprises at least the following components: event and check-in data aggregation, activity area generation and presentation, activity and event suggestion, time series summation, linked activities and events, and multivariate activity exploration.

The data aggregation component aggregates events in the temporal domain using a sliding window of time (e.g., a temporal window of one week) over all listed events. Sets of event locations are then determined. Clustering (or grouping) is performed (by the aggregation component 102 or a clustering component as part of the aggregation component 102) such that, in one implementation, each event in a particular set is at most a preset distance from at least one other event in the same set. This clustering enables aggregation of data around major cities while preserving the integrity of smaller sets in rural and/or suburban areas. Alternatively, other clustering (or grouping) techniques can be employed to achieve the same or similar results.

The clustered sets are assigned centroids and spatial radii that are representations of the clustered events encapsulated. Each clustered set is assigned a value that represents the percent of events within a given category found within the set's circular bounds. This clustering strategy groups data at its geographic center of mass and also preserves the spatial context (or influence) of each event activity.

Once events are clustered, the social check-in data is aggregated for each event set, within the same temporal window. Check-in data, the location of which lies within the circle of an event data cluster for the same time window, is accumulated for computing a check-in count for that specific cluster. This enables the estimation of the attendance size and popularity of each event cluster. For example, a sporting event such as football tends to have a much larger attendance footprint compared to the attendance of a pub concert next door. While it is not desired to discard smaller venue events due to the associated smaller attendance size, the activity suggestion component takes into consideration the number of people congregating in an area for an event and the event's popularity. This technique, while being an accurate indicator of popularity/attendance of an event ensures that the check-in data of subscribed users remains private.

With respect to activity area generation and presentation (e.g., a heatmap), the event clusters and corresponding accumulated check-in data provide a model of the event popularity or attendance. However, it is desirable to model the event and the event popularity distribution across the entire spatial extent (area of interest or regions). This enables not only the computation of areas for activities, but also estimates trends for areas where little or no data exist. Modeling the activity distribution across areas also enables the visualization of heatmaps for interesting things to do in an area.

Accordingly, the disclosed architecture estimates the probability density function of all event listings using the geo-referenced clusters and associated check-in counts. Kernel density estimation can be employed that takes a collection of sample points (e.g., the cluster centroids) and fits a weighting function at each point. (A kernel is a non-negative real-valued integrable function that can be integrated over all real values, and is symmetrical about the centroid.) The bandwidth of the kernel influences the magnitude of the kernel (i.e., kernels with large bandwidths have a smaller height).

The disclosed architecture enables the realtime (live) aggregation of event and social data for spatial or area-based activity suggestions by, in one implementation, estimating the joint probability distribution (via a probability density function) of the covariate and different activity variables using an efficient kernel density estimation method, which aggregates live or streaming-in social data in realtime.

For multivariate kernel density estimation, a quartic (biweight) kernel is used because the spatial kernel density estimate heatmaps compute to be optimally consistent across all event categories. Although less optimal, Epanechnikov, Triweight, and Gaussian kernels may be used. Both the density estimate for the specific activity category (e.g., dine, attend music concert or sporting event, shop, hike, etc.) as well as the density estimation are calculated for all categories using an appropriately chosen smooth parameter for each data set. The density estimation for the activity category of interest is then divided by the density estimation for the total activities to compute a percentage count for the expected number of activities within a given area.

The selection of activities and corresponding events that can be suggested to users is part of the activity area generation. Events and check-in data are sorted ("binned") into specific categories. The choice of bins is based on model assumptions of the expected percentage of events and check-ins within an area despite that each category of activity has varying model assumptions.

The disclosed architecture differs from existing recommendation systems, which are based on collaborative filtering or content-based filtering. Existing recommendation systems collect and analyze large amounts of information related to user behavior or preferences and then predict what users will like based on similarity to other users (e.g., as in collaborative filtering systems). In contrast, the disclosed architecture provides a suggestion capability that groups (e.g., clusters) and bins (categorizes) check-in data associated with events and entities, and uses a nearest centroid or nearest prototype classifier to suggest salient activities and corresponding events. Suggested activities and events take into consideration "live" social and event feeds, and are more than mere recommendations provided by existing systems. In other words, the disclosed architecture is a "live planner" or a "live personal concierge" for the user.

The set of salient activities for a given area and a specified time period are computed by assigning observed activities/check-ins the label of the class of training sample whose mean (centroid) is closest to the observation. Once the observed data is labeled for a given activity, the total number of check-ins are counted along with the number of events to calculate the strength of each activity, and then a top set of activities (e.g., five) is selected based on the activity strengths. Once an activity is selected, the labeled events are used and weighted with the number of check-ins for the corresponding venue in the past. These labeled events are then suggested to the user.

This approach makes the disclosed architecture computationally fast and dynamic—suggested events change based on any current check-ins that can be assimilated in realtime.

With respect to time series summation, while the spatial analysis and display of activity areas and corresponding events are useful for suggesting activities and events, an analysis of past data and extrapolation of the past data to upcoming or future activity areas is utilized in the suggestion formulation component. Time-series analysis (cumulative summation) is employed to predict (using the prediction component 204) the geographical areas that are most likely to have particular activities, corresponding attendance, and popularity (e.g., next week, next month). Time-series analysis provides the potential areas and activities in the temporal domain. This cumulative summation uses a temporal sliding window over past check-in and event data to find and predict the areas that have dominant activities in the future. For example, the past year's data can be used to find counts of events and check-in data within the sliding window of time of one week.

Applying cumulative summation over multiple years of data results in the dominant activities for a given area and the variation in time of these activities over a year. The time window can be normalized to account for weekends to accurately predict the activity distribution for an area for weekends and the associated week.

With respect to linked activities and events, numerous activities are correlated depending on the area and time. For example, a large count of check-ins in the attendance of a music concert in a downtown city area often correlates to a large count in the check-ins for dining events in the same area and at the same time.

While some activities in a list may be arguably related, many activities are mutually exclusive. Accordingly, cumulative summation curves for activities in an area can be used for finding activities that are correlated for a given time window. Activities can be considered pairwise and the product of their summation curves can be performed for computing the correlation curves. The correlation curves are smoothed and, the peaks and the corresponding time windows are stored for computing linked activities.

The peaks are used to suggest activities in the future when the strength of one activity is lower based on event listing data. This can be beneficial when provider-supplied event listing information is sparse, noisy, and/or missing, which can be addressed by smoothing the cumulative summation and correlation curves and subsequent use for suggesting activities based on related activities and events in the past.

With respect to multivariate activity exploration, the disclosed architecture also provides multiple viewing modalities (e.g., via the presentation component 206, which also provides the map generation and overlay capabilities) for visualizing multi-activity distribution. On a two-dimensional view of the local area (type of spatial extent), the density estimated heatmaps of more than one activity can be mapped. This enables users to peruse areas that have multiple activities and events; for example, users are able to search for (e.g., using logical connectors such as AND, OR, etc.) and explore areas that are desired for "dine" AND "be outdoors" AND "listen to music". Variable kernels are employed, since a fixed bandwidth kernel proves to be inappropriate for data due to sparseness of data for certain activity categories and in rural/suburban neighborhoods and, high check-in and event counts in urban neighborhoods. A large fixed bandwidth excessively flattens the density curves while accounting for sparse data regions. The variable kernels assist in the accurate representation of multivariate activities. The multivariate activity distributions also expose any linked activities and events, and any correlations therein are clearly visualized on the two-dimensional maps and in the temporal domain as well.

The systems (100 and 200) can optionally include a privacy component (not shown) for opting in or out of exposing personal information; although, as previously indicated, the disclosed architecture retains user anonymity during the processes to obtain the check-in data, attendance data, and popularity data for the aggregation (and grouping or clustering) of activities and suggested events.

The privacy component enables the subscriber to opt-in and opt-out of tracking information as well as personal information that may be obtained and utilized thereafter. The subscriber (user) can be provided with notice of the collection of personal information, for example, and the opportunity to provide or deny consent to do so. The privacy component may also enable the user to access and update profile information. For example, the user may view the personal and/or tracking data that has been collected, and provide corrections. The privacy component ensures the proper collection, storage, and access to the user subscriber information.

Figure 3:
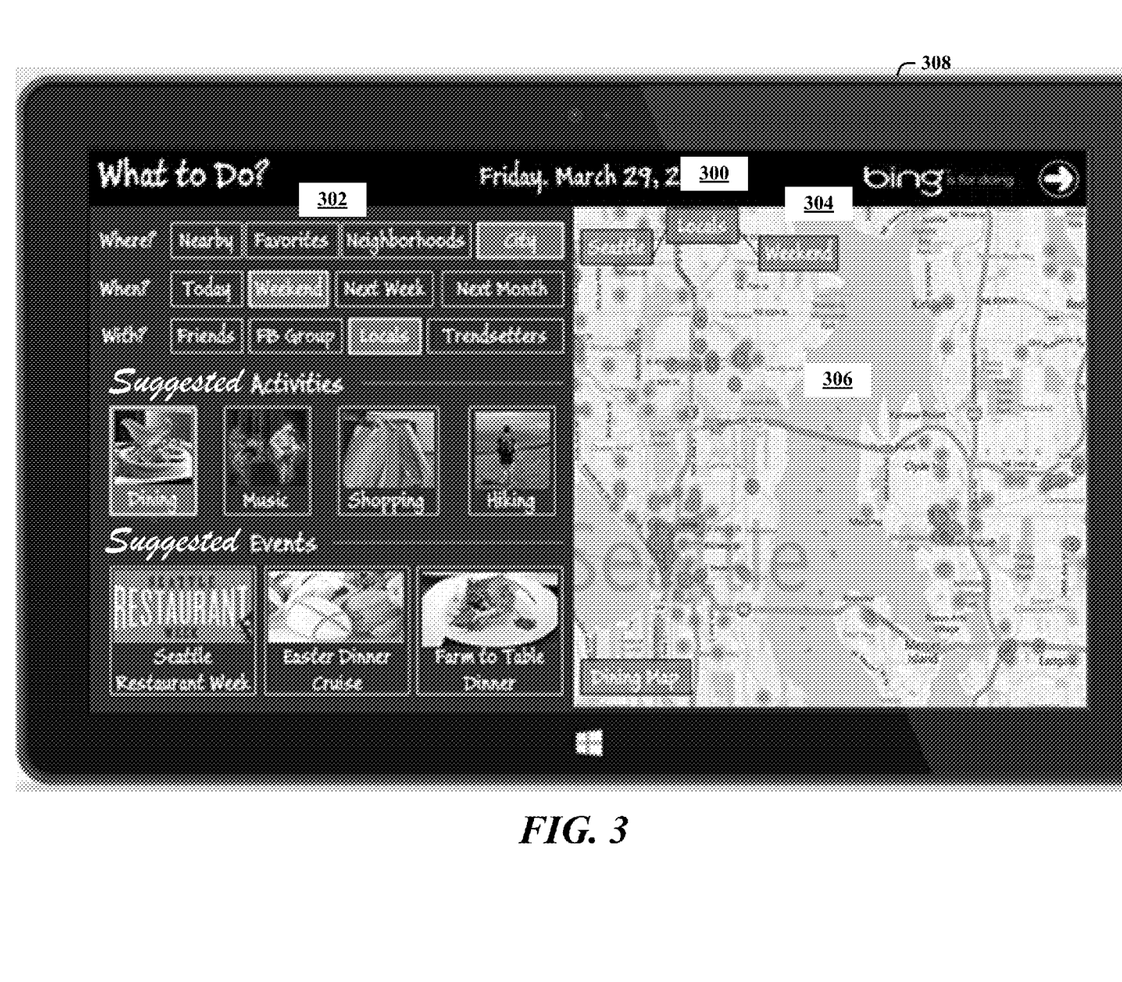
FIG. 3 illustrates an exemplary user interface that presents suggested activities that may be of interest to a user based on local event listings and past local check-in data in accordance the disclosed architecture.

FIG. 3 illustrates an exemplary user interface (UI) 300 that presents suggested activities that may be of interest to a user based on local event listings and past local check-in data in accordance the disclosed architecture. In this particular implementation, the UI 300 comprises two sections: a suggestions section 302 (on the left side of the device display) and a heatmap section 304 (on the right side of the device display). Additionally, the suggestion section 302 of the UI 300 further comprises three sections: a where, when, and what (WWW) section, a suggested activities section, and a suggested events section.

The WWW section provides interactive graphics and graphical annotations that enable a user to find events and activities in various spatial extents (e.g., where—nearby, favorites, neighborhoods, and city), during particular time spans (e.g., when—today, weekend, next week, and next month), and with other categories of users (e.g., with—friends, Facebook group, locals, and trendsetters).

The suggested activities section provides interactive graphics and graphical annotations that enable the selection of one of four categories of suggested activities: in this particular set of activity suggestions, dining, music, shopping, and hiking. Similarly, the suggested events section provides interactive graphics and graphical annotations that enable the selection of one of three events (related to the selected category of activity (dining)): in this particular set of event suggestions—three different dining events (e.g., restaurant week event, Easter dinner cruise event, and farm-to-table dinner event).

In the specific example illustrated, the user has selected "city" as the geographical area (spatial extent), "weekend" as the time span, and "locals" as with whom to share the experience. In response, the disclosed architecture returns and presents the four suggested activities of dining, music, shopping, and hiking, of which the user selects "dining". The architecture then returns and presents the three dining activities. The dining events can be in a ranked format (e.g., in descending order from left to right), or unranked, as configured.

In the heatmap section 304, the UI 300 can be configured to dynamically update the presented heatmap 306 according to each selection made by the user in the suggestion section 302. Thus, when the user selects city, a map of the city (for the user location, e.g., Seattle) can be presented. This city location (Seattle) selection is then also presented on the heatmap 306. Similarly, the selected WWW section options of "weekend" and "locals" are also presented on the heatmap 306.

It can be the case that prior to selecting the options in the WWW section, only a larger general geographical map is presented based on the current geographical location of the user (e.g., using geolocation data via the user device or other suitable location-based data sources). Alternatively, although not shown here, the UI 300 can be configured to enable the user to specifically select the geographical area of interest via the "where" option, and/or via the heatmap section 304 (e.g., using zoom-in/zoom-out on maps (tiles) obtained from a maps server).

Once the user and/or the system has identified the map for the spatial extent, the map can be overlayed with color gradations (although shown here in a grayscale format) to represent the heatmap 306 where event and activity aggregation is performed and the map is annotated with the heatmap graphics (varying degrees of colors (gradations) as applied to map locations) to show activities and events for that spatial extent and for the largest temporal window (e.g., one week span of time).

As the user next selects the "weekend" option, the heatmap 306 dynamically updates for the "city" to only show coloration for events and activities occurring on the weekend in the city. Similarly, when the user next selects "locals", the heatmap 306 is dynamically updated to only show events and activities that can be attended in the city, on the weekend, by locals. The top suggested activities are then presented in the suggested activities section. When the user selects one of the suggested activities (e.g., dining), the heatmap 306 again is dynamically updated to only show the most popular dining locations for the locals, on the weekend, in the city. Additionally, a "dining map" graphic is presented on the heatmap 306 for feedback to the user as to the current "dining" selection. The three suggested events are then displayed on the heatmap 306 as the most popular or "hotter" places (represented by brighter colors (e.g., yellows, greens)) relative to the other less popular or "cooler" places (e.g., represented by the darker colors (e.g., blue, grays)).

As the user may choose to explore other activities, using the same WWW section options, the heatmap 306 dynamically updates according to the user selections. Similarly, the user can choose a different time span (e.g., next week) and the heatmap 306 will also dynamically update for the same suggested dining activity for that span of time based on realtime activity and/or predicted activity (e.g., based on past activity).

This also means that, in an alternative implementation, the disclosed architecture enables the "look-back" in time of activities and events based on a corresponding temporal selection in the "when" portion of the WWW section. For example, consider that the WWW section also includes a "Last Weekend" button, that when selected shows the activities and events on the heatmap 306 that actually did occur over that span of time of the weekend (e.g., two days).

In yet another alternative implementation, the disclosed architecture enables the "look-back and look-forward" in time of activities and events based on a corresponding temporal selection in the "when" portion of the WWW section. For example, consider that the WWW section also includes a bi-directional slider control that covers a seven-day time span relative to today's date (the default slide control position), with three days on either side of today's date (three days into the past, and three days into the future). The user can then move the slider into the past to see the dynamically updated heatmap representation of activities and events that occurred in the past at that specific point in time that corresponds to the slider position, and into the future to see the dynamically updated heatmap representation of the events and activities predicted in the time remaining for today, and also over the next three days.

The device 308 facilitates the use of natural user interface (NUI) gestures in cooperation with the disclosed architecture, whereby the user employs one or more gestures for interaction. NUI may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example.

NUI technologies include, but are not limited to, touch sensitive displays (e.g., of the device 308), voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems, all of which provide a more natural user interface, as well as technologies for sensing brain activity using electric field sensing electrodes (e.g., electro-encephalograph (EEG)) and other neuro-biofeedback methods.

Figure 4:
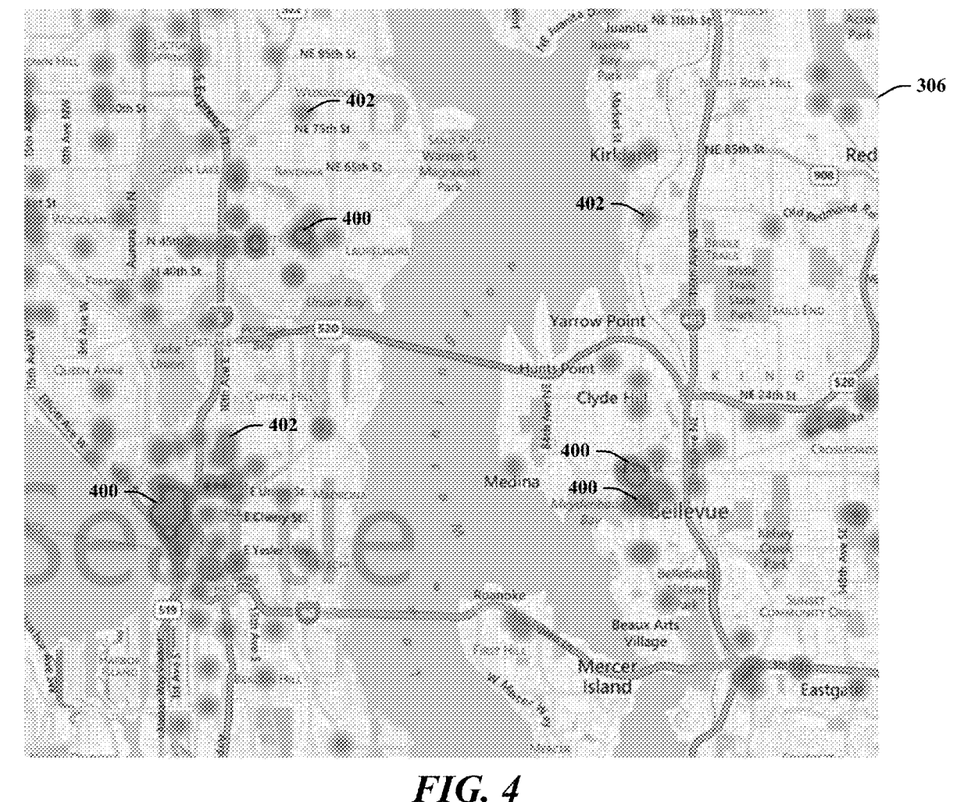
FIG. 4 illustrates an enlarged depiction of the heatmap of FIG. 3.

FIG. 4 illustrates an enlarged depiction of the heatmap 306 of FIG. 3. The heatmap 306 shows streets, highways, bodies of water, and neighborhoods, for example. The heatmap 306 also shows areas of higher activity 400 over the time span selected in the UI 300—a weekend. Although illustrated in grayscale, the areas of higher activity 400 can be brighter colors such as yellow and green, indicative of higher activity in terms of attendance activity and/or check-in activity, and the areas of lower activity 402 can be darker colors such as light and dark blue, indicative of lower activity in terms of attendance activity and/or check-in activity. As previously indicated, the heatmap 306 will also dynamically update for the same suggested dining activity for that span of time based on realtime activity and/or predicted activity (e.g., based on past activity).

"Heatmaps" or "hot zones" techniques are good mechanisms to display activity suggestions over time and/or to compare neighboring spatial extents. These spatial extents can be varied or changed by the user interaction such as zooming-in zooming-out actions, for example. Another facet of aggregating spatial data by kernel density estimation is that the activity suggestions for different spatial extents can be hierarchically aggregated (the aggregated value at a higher level can be calculated from the aggregations at a lower level).

Figure 5:
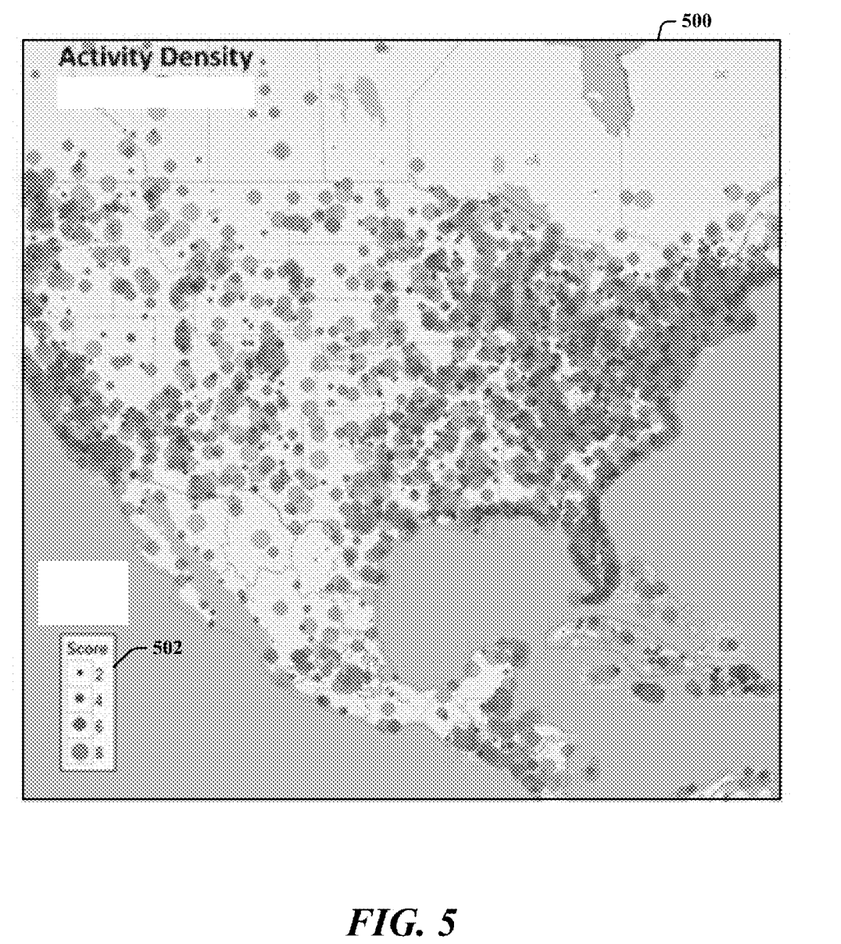
FIG. 5 illustrates an activity density heatmap for the United States for a specified span of time.

FIG. 5 illustrates an activity density heatmap 500 for the United States for a specified span of time. The various density graphics and values are indicated in a legend 502, where the group values range from two, four, six, and eight.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
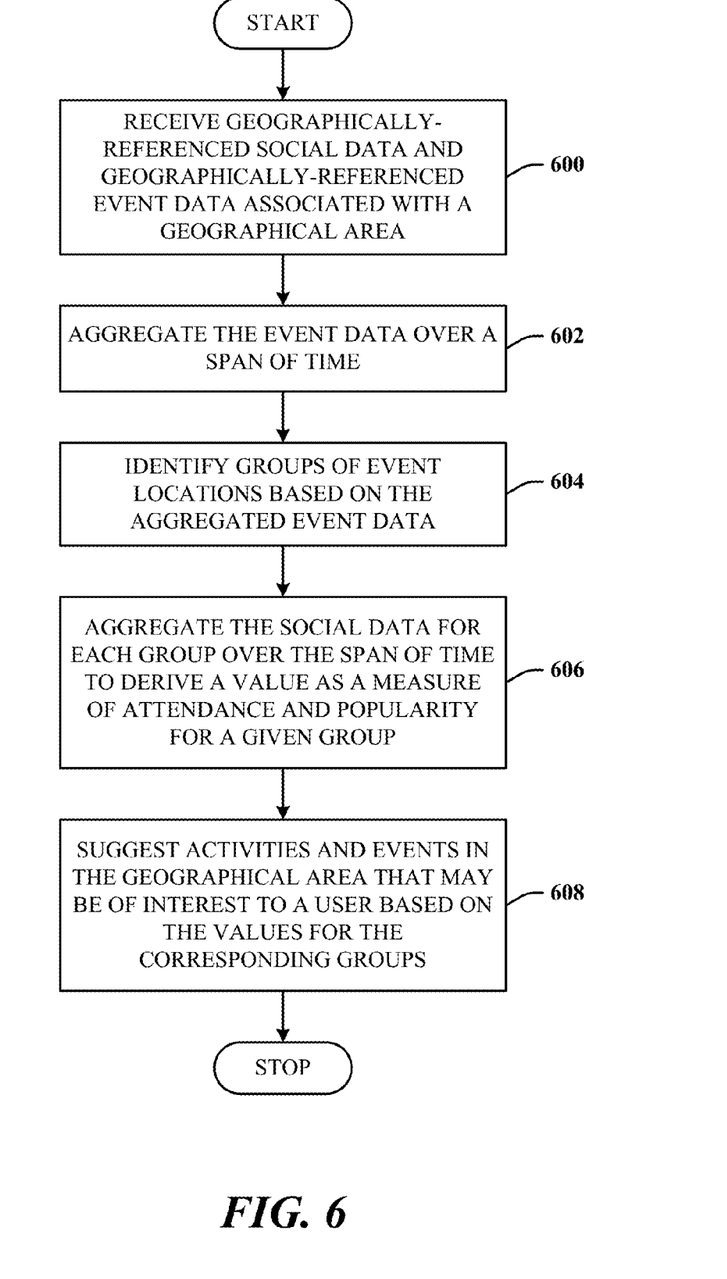
FIG. 6 illustrates a method in accordance with the disclosed architecture.

FIG. 6 illustrates a method in accordance with the disclosed architecture. At 600, geographically-referenced social data and geographically-referenced event data associated with a geographical area is received. At 602, the event data is aggregated over a span of time. At 604, groups of event locations are identified based on the aggregated event data. At 606, the social data for each group is aggregated over the span of time to derive a value as a measure of attendance and popularity for a given group. At 608, activities and events in the geographical area are suggested that may be of interest to a user based on the values for the corresponding groups.

The method can further comprise presenting the activities for a user-specified area on a geographically-based heatmap. The method can further comprise predicting upcoming activities and geographical areas for the upcoming activities and events based on historical information. The method can further comprise suggesting the activities and events for a user-specified location based on user preferences, context, and intent. The method can further comprise suggesting the activities and events chronologically based on a user-specified geographical area and span of time. The method can further comprise suggesting activities related to a specific activity selected by a user and that depends on the user location, time, and/or user preferences.

Figure 7:
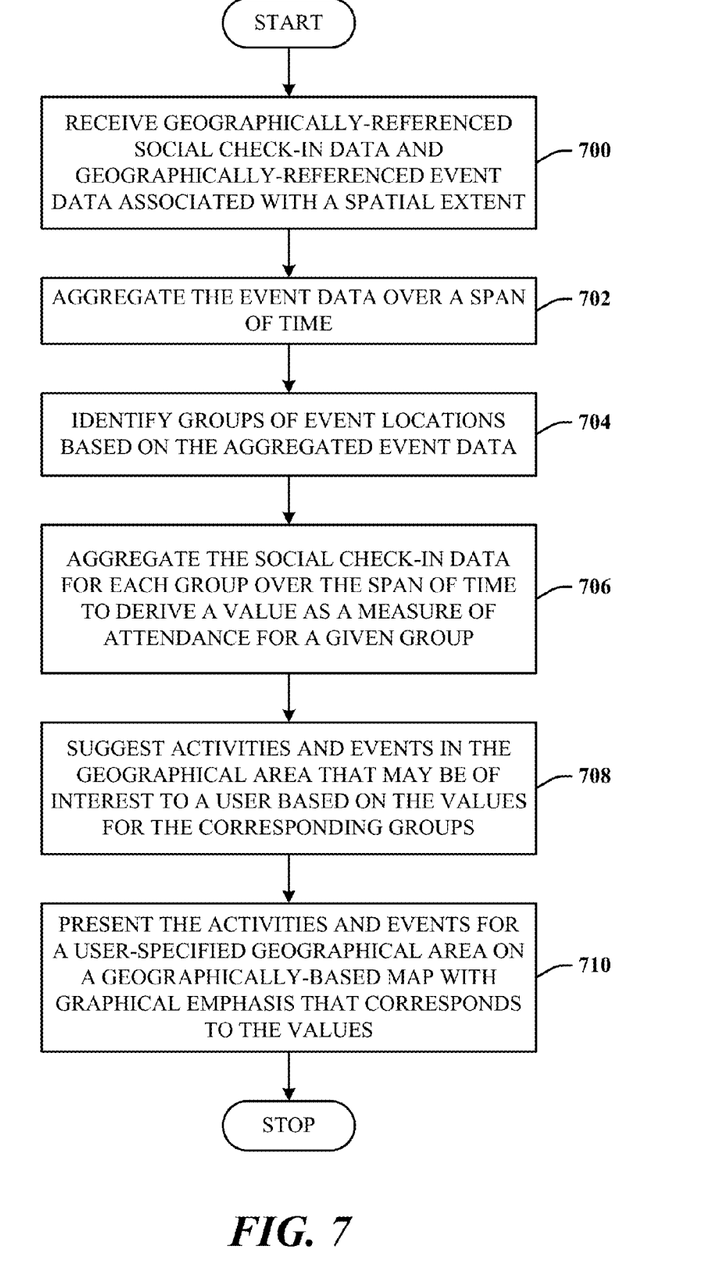
FIG. 7 illustrates an alternative method in accordance with the disclosed architecture.

FIG. 7 illustrates an alternative method in accordance with the disclosed architecture. The method can be embodied on a computer-readable medium comprising computer-executable instructions that when executed by a microprocessor, cause the microprocessor to perform the following acts. At 700, geographically-referenced social check-in data and geographically-referenced event data associated with a spatial extent is received. At 702, the event data is aggregated over a span of time. At 704, groups of event locations are identified based on the aggregated event data. At 706, the social check-in data for each group is aggregated over the span of time to derive a value as a measure of attendance and popularity for a given group. At 708, activities and events in the geographical area that may be of interest to a user are suggested based on the values for the corresponding groups. At 710, the activities and events for a user-specified geographical area are presented on a geographically-based map with graphical emphasis that corresponds to the values.

The acts of the method can further comprise predicting upcoming activities and geographical areas for the upcoming activities and events based on historical information. The acts of the method can further comprise suggesting the activities and events for a user-specified location of the spatial extent based on user preferences, context, and intent. The acts of the method can further comprise suggesting the activities and events chronologically based on a user-specified geographical area and span of time. The acts of the method can further comprise generating activity profiles for given users for filtering across the span of time and spatial extents and suggesting the activities and events in realtime.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
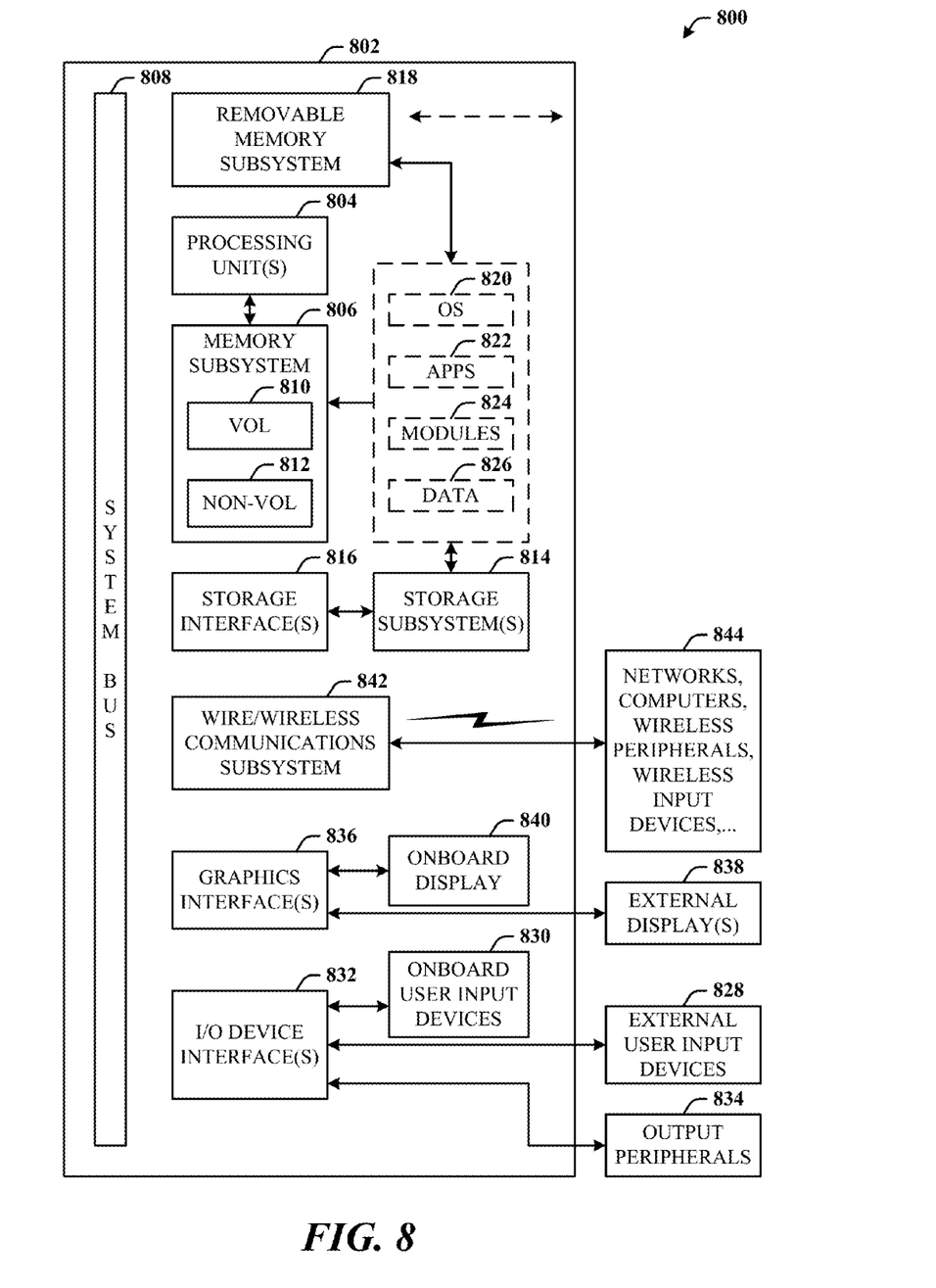
FIG. 8 illustrates a block diagram of a computing system that executes instructions for the aggregation of realtime geo-referenced data over geographical areas to suggest events that may be of interest to a user, in accordance with the disclosed architecture.

Referring now to FIG. 8, there is illustrated a block diagram of a computing system 800 that executes instructions for the aggregation of realtime geo-referenced data over geographical areas to suggest events that may be of interest to a user, in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having microprocessing unit(s) 804 (also referred to as microprocessor(s) and processor(s)), a computer-readable storage medium such as a system memory 806 (computer readable storage medium/media also include magnetic disks, optical disks, solid state drives, external memory systems, and flash memory drives), and a system bus 808. The microprocessing unit(s) 804 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage) medium such as a volatile (VOL) memory 810 (e.g., random access memory (RAM)) and a non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the microprocessing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components and circuits. The storage subsystem(s) 814 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and components of the system 200 of FIG. 2, entities and components of the user interface of FIG. 3, depiction of the heatmap 306 of FIG. 4, activity density heatmap 500 of FIG. 5, and the methods represented by the flowcharts of FIGS. 6 and 7, for example.

Generally, programs include routines, methods, data structures, other software components, etc., that perform particular tasks, functions, or implement particular abstract data types. All or portions of the operating system 820, applications 822, modules 824, and/or data 826 can also be cached in memory such as the volatile memory 810 and/or non-volatile memory, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 802, and include volatile and non-volatile internal and/or external media that is removable and/or non-removable. For the computer 802, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 802, programs, and data using onboard user input devices 830 such a touchpad, microphone, keyboard, etc., where the computer 802 is a portable computer, for example.

These and other input devices are connected to the microprocessing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a hardware processor, and a memory device configured to store computer-executable instructions, that when executed by the hardware processor, enable:
   an aggregation component configured to receive geographically-referenced social data and geographically-referenced event data associated with a spatial extent, to aggregate the event data over a span of time, to identify groups of event locations based on the aggregated event data, and to aggregate the social data for each group over the span of time to derive a value as a measure of attendance for a given group; and
   a suggestion component configured to suggest an itinerary of a series of activities in the spatial extent of the event data to a user based on the values for the corresponding groups.

2. The system of claim 1, wherein the social data is check-in data, and the spatial extent is a geographical area or a virtually defined area.

3. The system of claim 1, wherein the aggregation component is configured to model an event and associated popularity distribution across the spatial extent.

4. The system of claim 1, wherein the suggestion component is configured to suggest activities based in part on user preferences, user context, and user intent for a given user-specified location.

5. The system of claim 1, wherein the suggestion component is configured to suggest a series of activities and events based on a user-specified time and location.

6. The system of claim 1, wherein the suggestion component is configured to suggest new activities that relate to a given selected activity based on user location and time.

7. The system of claim 1, further comprising a profile component configured to generate activity profiles of users, which are applied as filters across different times and locations for suggesting the activities by the suggestion component in realtime.

8. The system of claim 1, further comprising a prediction component configured to predict future activities and spatial extents for the future activities based on past activity and event data.

9. The system of claim 1, further comprising a presentation component configured to provide activity regions on a map that delineates areas, streets, and neighborhoods for one or more activities and for presentation to the user.

10. A method, comprising acts of:
    receiving geographically-referenced social data and geographically-referenced event data associated with a geographical area;
    aggregating the event data over a span of time;
    identifying groups of event locations based on the aggregated event data;
    aggregating the social data for each group over the span of time to derive a value as a measure of attendance and popularity for a given group; and
    suggesting an itinerary of activities and events in the geographical area that may be of interest to a user based on the values for the corresponding groups.

11. The method of claim 10, further comprising presenting the activities for a user-specified area on a geographically-based heatmap.

12. The method of claim 10, further comprising predicting upcoming activities and geographical areas for the upcoming activities and events based on historical information.

13. The method of claim 10, further comprising suggesting the activities and events for a user-specified location based on user preferences, context, and intent.

14. The method of claim 10, further comprising suggesting the activities and events chronologically based on a user-specified geographical area and span of time.

15. The method of claim 10, further comprising suggesting activities related to a specific activity selected by a user and that depends on the user location and time.

16. A computer-readable hardware storage medium comprising computer-executable instructions that when executed by a hardware microprocessor, cause the microprocessor to perform acts of:
    receiving geographically-referenced social check-in data and geographically-referenced event data associated with a spatial extent;
    aggregating the event data over a span of time;
    identifying groups of event locations based on the aggregated event data;
    aggregating the social check-in data for each group over the span of time to derive a value as a measure of attendance for a given group;
    suggesting a series of activities and events in the geographical area that may be of interest to a user based on the values for the corresponding groups; and presenting the activities and events for a user-specified geographical area on a geographically-based map with graphical emphasis that corresponds to the values.

17. The computer-readable hardware storage medium of claim 16, further comprising predicting upcoming activities and geographical areas for the upcoming activities and events based on historical information.

18. The computer-readable hardware storage medium of claim 16, further comprising suggesting the activities and events for a user-specified location of the spatial extent based on user preferences, context, and intent.

19. The computer-readable hardware storage medium of claim 16, further comprising suggesting the activities and events chronologically based on a user-specified geographical area and span of time.

20. The computer-readable hardware storage medium of claim 16, further comprising generating activity profiles for given users for filtering across the span of time and spatial extents and suggesting the activities and events in realtime.

* * * * *